United States Patent [19]
LaFave

[11] Patent Number: 5,945,013
[45] Date of Patent: Aug. 31, 1999

[54] METHOD OF WELDING

[75] Inventor: Richard A. LaFave, Monroeville, Pa.

[73] Assignee: Elliott Turbomachinery Co., Inc., Jeannette, Pa.

[21] Appl. No.: 08/909,521

[22] Filed: Aug. 12, 1997

[51] Int. Cl.$^6$ .................................................. B23K 9/04
[52] U.S. Cl. ................................. 219/137 PS; 29/889.1; 219/137 WM
[58] Field of Search ................... 219/137 PS, 137 R, 219/73, 73.11, 73.21, 76.1, 76.12; 29/889.1, 889.2, 889.21

[56] References Cited

U.S. PATENT DOCUMENTS

| | | | |
|---|---|---|---|
| 4,213,025 | 7/1980 | Kuhnen | 219/73.21 |
| 4,219,717 | 8/1980 | Kuhnen | 219/137 R |
| 4,237,361 | 12/1980 | Zwintscher et al. | 219/73.11 |
| 4,633,554 | 1/1987 | Clark et al. | 219/137 R |
| 4,958,431 | 9/1990 | Clark et al. | 29/889.1 |
| 5,024,582 | 6/1991 | Bellows et al. | 29/889.2 |
| 5,591,363 | 1/1997 | Amos et al. | 219/137 PS |
| 5,831,241 | 11/1998 | Amos | 219/137 PS |

OTHER PUBLICATIONS

"Specification for Covered Carbon Steel Arc Welding Electrodes", *ANSI/AWS A5 1–81*, (1981) pp. 27–28.

"Specification for Carbon Steel Electrodes for Shielded Metal Arc Welding", *ANSI/AWS A5–1–91*, 1991) p. 38.

"Welding Processes", *Welding Handbook*, Eighth Edition, vol. 2, pp. 52–53.

*Primary Examiner*—Clifford C. Shaw
*Attorney, Agent, or Firm*—Webb Ziesenheim Logsdon Orkin & Hanson, P.C.

[57] ABSTRACT

A method of arc welding to build the thickness of a high sulfur, low alloy steel workpiece comprises the steps of preparing the surface of the high sulfur, low alloy workpiece; applying a layer of metal over the prepared surface using a low energy arc; and applying additional layers of metal using a high energy welding arc.

12 Claims, No Drawings

METHOD OF WELDING

BACKGROUND OF THE INVENTION

It has been estimated that over 80% of the electric power used in the United States is obtained from generators driven by steam turbines. These comprise large machines that are rated between 500,000 and 1,000,000 kW and even larger. Many of the steam turbines in service today were built years ago when metallurgical practices were very different than they are today. Thus, older steam turbine rotors were produced from steel made in the open hearth process which has high levels of residual elements compared with steels made today using the basic oxygen process. These residual elements comprise sulfur, oxygen and phosphorous but may include others. The elements can affect the weldability of rotor steel. This has complicated the repair of rotors in older steam turbines.

In some instances, old rotors can be welded successfully by use of basic weld fluxes that aid in the deoxidation and desulfurization of the rotor steel adjacent the weld. Sometimes, however, use of basic fluxes is not sufficient.

It is an advantage, according to this invention, to provide a method of arc welding to build the thickness of high sulfur, low alloy steel such as encountered in the repair of very old steam turbine rotors.

SUMMARY OF THE INVENTION

Briefly, according to this invention, there is provided a method of arc welding to build a thickness of a high sulfur, low alloy steel workpiece. The method comprises a first step of preparing the surface of the high sulfur, low alloy steel workpiece. The next step comprises applying a layer of metal over the prepared surface using a low energy arc. The final essential step comprises applying additional layers of metal using a high energy welding arc. Preferably, the high energy welding arc draws two to three times the electrical current as the low energy welding arc. This method is especially useful for a high sulfur, low alloy steel workpiece having a sulfur content in excess of 0.025% by weight.

According to a preferred embodiment, the layer applied using the low energy arc is applied by the shielded metal arc welding process using coated low alloy steel electrodes with a low moisture covering such as electrodes type E11018M and an arc current in the range of 100 to 200 amps. The layer applied using the high energy arc is applied by the submerged arc welding process with bare wire electrodes and a lime/fluoride flux wherein the wire electrodes are type EF5 and the arc current is in the range of 400 to 900 amps.

Typically, the shielded metal arc welding step is a step in which the weld metal is manually applied and the submerged arc welding step is mechanized.

DESCRIPTION OF THE PREFERRED EMBODIMENTS

When metal parts are built up by welding, as in any welding process, there is a certain amount of intermixing of the metal laid down by melting and the metal at the surface of the parts themselves. The composition of the weld deposit is diluted (or contaminated) by the composition of the parts. The lower the dilution, the less effect the base metal composition residual elements have upon the weld deposit composition. Percentage dilution may be represented by the following formula:

$$\text{Dilution (\%)} = \frac{B}{A+B} \times 100$$

where A is the amount (by weight) of the filler metal and B is the amount (by weight) of the base metal in the weld deposit.

Different welding processes produce weld deposits with greater or lesser dilutions. This invention contemplates the use of both low dilution and high dilution welding practices to overcome the problems inherent in welding, for example, old low alloy steel turbine rotors having a high sulfur content.

Low alloy steels contain less than about 10% by weight of alloying elements such as chromium, nickel, molybdenum, vanadium, tungsten, and so forth. The alloys have been intentionally added to enhance properties, for example, strength of the steel. In the case of a particular old turbine rotor repaired according to the teachings of this invention, the steel comprised about 2½% nickel, ½% molybdenum and 0.6% vanadium. The remaining elements, aside from iron, were 0.11% chromium, 0.28% carbon, 0.75% magnesium and 0.24% silicon. Also present were the elements that are detrimental to welding, namely, 0.035% phosphorous and 0.037% sulfur.

It had been found that with mechanized submerged arc welding using a lime/fluoride base flux and electrode wire comprising 2.5% nickel, 0.4% chromium, 0.5% molybdenum, 2% manganese, 0.2% silicon, 0.12% carbon, less than 0.010% sulfur, less than 0.010% phosphorous and less than 0.05% copper resulted in cracking on the initial layer where the sidewall met the base diameter.

According to the method of this invention, a successful repair and build up was produced by first using the shielded arc welding process with low hydrogen electrodes to deposit a first weld metal layer. Low hydrogen electrodes have mineral coverings which are high in limestone and other ingredients that are low in moisture. The particular electrode type chosen was E11018M having a typical composition of 0.10% carbon, 1.30% to 1.80% manganese, 0.60% silicon, 0.03% phosphorous, 0.030% sulfur, 1.25% to 2.50% nickel, 0.40% chromium, 0.25% to 0.50% molybdenum and 0.05% vanadium.

The shielded metal arc welding process for a comparable electrode size operates as ½ to ⅓ the amperage of the submerged arc welding process. Thus, the shielded metal arc welding process penetrates and welds less base metal. Shielded metal arc welding steel has the advantage of a flux reacting with the molten weld pool. However, the deposit rate is reduced as compared to submerged arc welding.

Following deposit of the first layer using the shielded arc welding process, the submerged arc welding process was used to complete the build up without experiencing cracking.

The shielded metal arc welding process (SMAW) results in a dilution about 10% to 20%, whereas the submerged arc welding process (SAW) results in a dilution of 25% to 35%. By laying down a first layer using low hydrogen electrodes and a low dilution SMAW process, it was possible to use the speedier and mechanized SAW process to complete a successful build up.

Having thus defined my invention with the detail and particularity required by the Patent Laws, what is desired protected by Letters Patent is set forth in the following claims.

I claim:

1. A method of arc welding to build the thickness of a high sulfur, low alloy steel workpiece having a sulfur content in excess of 0.025% by weight, the method comprising the steps of:

a) preparing the surface of the high sulfur, low alloy workpiece;

b) applying, by the shielded arc welding process using coated low alloy steel electrodes with a low moisture covering, a layer of metal over the prepared surface using a low energy arc; and c) applying additional layers of metal using a high energy welding arc.

2. The method according to claim 1, wherein the high energy welding arc draws two to three times the electrical current as the low energy welding arc.

3. The method according to claim 1, wherein the layer applied using the high energy arc is applied by the submerged arc welding process with a bare wire electrode and a lime/fluoride flux.

4. The method according to claim 3, wherein the shielded metal arc welding step is manually applied and submerged arc welding steps are mechanized.

5. The method according to claim 3, wherein the bare wire electrodes are type EF5 and the arc current is in the range of 400 to 900 amps.

6. The method according to claim 1, wherein the coated electrodes are type E11018M and the arc current is in the range of 100 to 200 amps.

7. A method of arc welding to build the thickness of a high sulfur, low alloy steel workpiece, the method comprising the steps of:

a) preparing the surface of the high sulfur, low alloy workpiece;

b) applying, by the shielded arc welding process using coated low alloy steel electrodes with a low moisture covering, a layer of metal over the prepared surface using a low energy arc; and c) applying additional layers of metal using a high energy welding arc.

8. The method according to claim 7, wherein the high energy welding arc draws two to three times the electrical current as the low energy welding arc.

9. The method according to claim 7, wherein the layer applied using the high energy arc is applied by the submerged arc welding process with a bare wire electrode and a lime/fluoride flux.

10. The method according to claim 9, wherein the shielded metal arc welding step is manually applied and submerged arc welding steps are mechanized.

11. The method according to claim 9, wherein the bare wire electrodes are type EF5 and the arc current is in the range of 400 to 900 amps.

12. The method according to claim 7, wherein the coated electrodes are type E11018M and the arc current is in the range of 100 to 200 amps.

* * * * *